(12) United States Patent
Hash et al.

(10) Patent No.: US 6,268,723 B1
(45) Date of Patent: Jul. 31, 2001

(54) MAGNETIC FIELD EMISSION AND DIFFERENTIAL RECEIVER COIL CONFIGURATION FOR DISCRIMINATING RESPONSE MAGNETIC FIELD FROM TRANSPONDER TAG

(75) Inventors: Ronald J. Hash; Donald K. Belcher, both of Rogersville; Robert W. Boyd, Eidson, all of TN (US)

(73) Assignee: Wherenet Corporation, Santa Clara, CA (US)

( * ) Notice: Subject to any disclaimer, the term of this patent is extended or adjusted under 35 U.S.C. 154(b) by 0 days.

(21) Appl. No.: 09/159,555

(22) Filed: Sep. 24, 1998

Related U.S. Application Data
(60) Provisional application No. 60/060,185, filed on Sep. 26, 1997.

(51) Int. Cl.[7] .......................... G08B 13/24; G08B 13/14; G01N 27/72; G01R 33/12
(52) U.S. Cl. .......................... 324/243; 324/239; 340/551; 340/572.1
(58) Field of Search .................................. 324/239, 243, 324/241; 340/551, 572.1, 572.4

(56) References Cited

U.S. PATENT DOCUMENTS
5,034,689 * 7/1991 Inoue et al. .......................... 324/243
5,726,628 * 3/1998 Yoo ...................................... 324/239

* cited by examiner

*Primary Examiner*—Walter E. Snow
(74) *Attorney, Agent, or Firm*—Allen, Dyer Doppelt Milbrath & Gilchrist, P.A.

(57) ABSTRACT

A magnetic field excitation and detection coil arrangement is configured to produce an electrical output signal representative of a differential combination of responses from a plurality of magnetic fields, including the field emitted from the excitation coil, a response magnetic field emitted from an object-tagged transponder interrogated by the excitation coil, and other magnetic fields from extraneous sources, such as industrial machinery. This differential combination of the responses from the detection coils will contain only the desired signal (e.g., response from an object-tagged transponder), as the other far away fields cancel, and therefore produces a net output signal level for a downstream signal (transponder output) processor.

10 Claims, 1 Drawing Sheet

MAGNETIC FIELD EMISSION AND DIFFERENTIAL RECEIVER COIL CONFIGURATION FOR DISCRIMINATING RESPONSE MAGNETIC FIELD FROM TRANSPONDER TAG

CROSS-REFERENCE TO RELATED APPLICATION

The present application claims the benefit of Provisional Patent Application Serial No. 60/060,185, filed Sept. 26, 1997, entitled: "Wibar Signaling Scheme," assigned to the assignee of the present application and the disclosure of which is incorporated herein.

FIELD OF THE INVENTION

The present invention relates in general to magnetic field generation and detection systems, and is particularly directed to a new and improved magnetic field excitation and receiver coil or transducer configuration that is operative to produce an electrical output representative of a differential combination of responses from a plurality of magnetic fields impinging thereon. These fields include the excitation field, a response magnetic field generated from an object-tagged transponder and other (noise source) magnetic fields. The receiver coils are connected in opposite polarity, so that energy from the excitation coil and relatively distant sources is canceled, while producing a useful net output for the field produced by a nearby (object-tagged) transponder.

BACKGROUND OF THE INVENTION

The use of magnetic fields for communications and the powering of short-range wireless (e.g., object detection) systems is becoming widespread in a variety of industries and technologies. Many of these systems produce large signal levels at the source (or reader) to power transducers (or tags) at short range and look for relatively small return signals from transducers. Most of these systems find application in very benign electromagnetic environments, such as, but not limited to retail outlets and filling stations.

In one type of system, the transducers may be configured as relatively simple resonators which are detected by their resonate response due to an exciting magnetic field. In a second type of system, the tag may contain transponder circuitry that is powered-up by an incident field and responds by modulating that field or generates an independent electromagnetic response. As these types of systems become more capable in range, simultaneous reading of multiple transducers, more capable transducers, etc. will be required.

Where application of such systems includes severe electromagnetic environments, such as those produced by machinery and processes (e.g., welding, induction heating, dielectric heating, industrial lighting and large electric motors) employed in heavy industry, the ability to overcome environmental interference becomes a fundamental requirement. All of these tools, when sized for heavy industry, produce significant field levels and broadband electromagnetic noise that can interfere with and even disable reader/transponder systems using magnetic fields.

SUMMARY OF THE INVENTION

In accordance with the present invention, there is provided a magnetic field excitation and detection coil arrangement that is configured to produce an electrical output signal representative of a differential combination of responses from a plurality of magnetic fields impinging thereon. Such incident magnetic fields may include the field emitted from the excitation coil, a response magnetic field emitted from an object-tagged transponder being interrogated by the excitation coil, and other magnetic fields from extraneous sources, such as industrial equipment or machinery. This differential combination of the responses from the detection coils will contain only the desired signal (e.g., response from an object-tagged transponder), as the excitation field and other far away fields cancel and therefore produces a net output signal level that is available to a downstream signal processor.

In a first embodiment of the invention, which may be employed in a wand-configured, or a compact, hand-portable device, an magnetic field excitation coil is wound around a generally cylindrically configured rod of high magnetic permeability material, such as a ferromagnetic rod, which provides shaping of the generated magnetic field along the rod axis, and assists in producing higher field levels over a larger area. A receiver coil arrangement comprises a pair of cylindrically wound electrically identical receive coils that are coaxial with and spaced apart equidistant from and in close proximity with opposite ends of the excitation coil. In addition, the receive coils are connected such that their winding directions are opposite to one another.

When the excitation coil is energized, a magnetic field is emitted from the ferrite core. Since magnetic field strength is proportional to the inverse of the distance from a very close proximity magnetic field source, and since the receive coils are equidistant from the excitation coil, as for relatively distant sources, the received magnetic field energy at both receiver coils will be effectively the same. As a result, since the receiver coils are connected in opposite polarity, energy from the excitation coil and relatively distant sources is canceled, which serves to protect sensitive receiver electronics from the large potentials and transients that may be produced by the excitation coil. It also prevents interference with nearby (object-tagged) transponder responses.

When the magnetic field generated by the excitation coil is used to elicit a response from a nearby object (e.g., a magnetic field generated from a tag-embedded transponder of the type described in the above-referenced continuation-in-part application), the response magnetic field will be received by the two receive coils at different amplitude levels due to the lateral displacement of the coils along the ferrite core axis, thereby producing a net signal amplitude for a transponder response field.

In a second embodiment, a large area excitation—response coil arrangement of the coils provides doorway and conveyor belt coverage. In this embodiment, the size of the excitation coil may be on the order of the area to be monitored for one or more object-tagged transponders. As in the first embodiment, a pair of receiver coils are displaced laterally on the same axis as the excitation coil. Because increased area coverage requires the used of very large sized coils, lateral displacement therebetween must also increase in order to minimize loss of the desired signals in the composite output. To overcome this potential drawback, each receiver coil may be implemented as a plurality smaller coils connected in an array and placed in parallel planes, that are equidistant from the excitation coil.

DETAILED DESCRIPTION

As described briefly above, the magnetic field excitation and detection coil arrangement of the present invention is configured to produce an electrical output signal that is representative of a differential combination of responses from a plurality of magnetic fields impinging thereon, including the field emitted from the excitation coil, a response magnetic field, such as that emitted from an object-tagged transponder, as well as other magnetic fields from extraneous sources, such as equipment or machinery employed in a severe industrial environment as described above. Because of the configuration of the inventive coil arrangement, the differential or net combination of the responses from the detection coils will contain only the desired signal (e.g., response from an object-tagged transponder).

As a non-limiting example, an object-tagged transponder system in which the present invention may be employed may of the type described in co-pending U.S. patent application Ser. No. 09/159,554, filed coincident herewith, by D. K. Belcher et al, entitled: "Object Identification System Employing Pulsed Magnetic Field-Stimulated, Tag-Embedded Transponder." Such co-pending application is a continuation-in-part of parent U.S. patent application Ser. No. 08/779,302, filed Jan. 6, 1997, by D. Belcher et al, entitled: "Object Identification System Employing Orientation-Independent, Magnetic Field-Stimulated, Tag-Embedded Transponder, now abandoned." Each of these applications is assigned to the assignee of the present application and their disclosures are incorporated herein.

Figure 1:
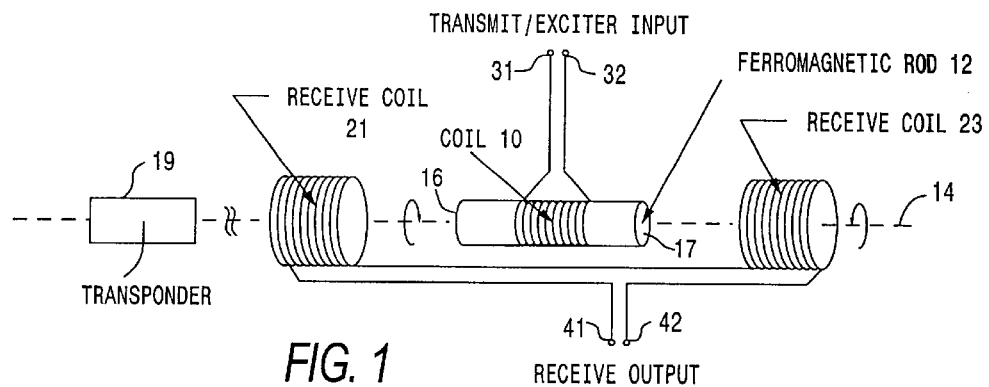
FIG. 1 diagrammatically illustrates the architecture of a compact magnetic field excitation and detection coil arrangement employed for short range, small area coverage in accordance with first embodiment of the invention.

Attention is now directed to FIG. 1, which is a diagrammatic illustration of the architecture of a compact magnetic field excitation and detection coil arrangement that may be employed for short range, small area coverage, in accordance with a first embodiment of the invention. As a non-limiting example, this architecture may be employed in a wand-configured, or a compact, hand-portable 'gun' configured arrangement of the type shown in FIG. 7 of the above-identified continuation-in-part application.

In the embodiment of FIG. 1, the coil arrangement consists of an exciter or excitation coil 10 that is wound around a generally cylindrically configured rod or core 12 made of ferromagnetic material. This ferrite core 12 enables the performance and range of a larger coil to be obtained in a relatively compact or confined housing configuration. The ferrite rod 12 provides a degree of directivity to or shaping of the generated magnetic field along the rod axis when the coil 10 is energized. It also aids in producing higher field levels over a larger area than the coil 10 alone would.

A pair of cylindrically wound electrically identical receive coils 21 and 23 are coaxial with a longitudinal axis 14 of the exciting coil 10 and the ferrite core 12 upon which it is wound. Coils 21 and 23 are spaced apart equidistant from and arranged in close proximity with respective opposite ends 16 and 17 of the core 12 for compact and/or hand-held operation. The receive coils 21 and 23 are connected such that their winding directions (field directions) are opposite for the two coils (i.e. opposite polarity). They may be connected in series or parallel depending on the impedance desired.

In operation, the excitation coil 10 is energized with an AC signal or pulse supplied to its input terminals 31 and 32, so as to cause a magnetic field to be emitted from the ferrite core 12. As described above, when used with an object location system, this magnetic field may be employed for powering and/or communicating with a wireless transponder, as described in the above-reference continuation-in-part application. Since magnetic field strength or amplitude is proportional to the inverse of the distance from a very close proximity magnetic field source, and since the receive coils 21 and 23 are equidistant from the excitation coil 10, magnetic field energy is received at an equal level at both of the receive coils 21 and 23.

Since the receiver coils 21 and 23 are connected in opposite polarity, the energy received thereby is canceled. This serves to protect sensitive receiver electronics to which the receiver output terminals 41 and 42 are coupled, from the large potentials and transients that may be produced by the exciting coil 10. The magnetic field strength of far-away sources, such as environmental noise, industrial interferers and radio stations, is proportional to the inverse of the distance cubed. Therefore, the energy received from these far-away sources is equal at each of the receive coils 21 and 23, since they are arranged close to each other compared to their distance from the far-away source. Again, such cancellation of this far-away energy prevents it from interfering with nearby (object-tagged) transponder responses.

The magnetic field generated by the excitation coil 10 may be used in several ways to elicit a response from a nearby object (e.g., a magnetic field generated from a tag-embedded transponder of the type described in the above-referenced continuation-in-part application), particularly one located in the direction of the coil axis 14. The response magnetic field will be received by the two receive coils 21 and 23 at different amplitude levels due to the lateral displacement of the coils along the axis 14.

As pointed out above, the received magnetic field amplitude is proportional to the inverse of the distance for magnetic field sources that are very close to the receivers 21 and 23, but is proportional to the inverse of the distance cubed for magnetic field emitters that are distant compared to the size of the receive coils. Since the receive coils 21, 23 are separated by some defined distance, for a relatively close emitter (e.g., one within one or several coil diameter distances), the energy received by coil 21 will be different from the energy received from the other coil 23. As a consequence the resultant field amplitudes do not exactly cancel and therefore produce a net signal level that is available to a detector, receiver, or demodulation circuitry coupled to output terminals 41, 43.

For purposes of providing a relatively simple example of this effect, consider that the receive coils 21 and 23 have a diameter on the order of 1.5 inches and an axial spacing or separation of one foot therebetween. Also, let a magnetic field emitter (transponder) 19 be located on axis 14 and spaced one foot away from the end of receive coil 21 (and therefore two feet away from the other receive coil 23). Since the magnetic field strength received by each coil is approximately proportional to the inverse of the cube or third power of the distance from the source, the energy received by each of the coils 21 and 23 is approximately proportional to the inverse of the distance cubed.

Therefore, the energy received by coil 21 is $(1/1)^3=1.0$, whereas that received by the coil 23 is $(1/2)^3=0.125$, since it is much farther away compared to the 1.5 inch coil diameter. Since the coils 21 and 23 are connected in opposite polarity, the total or net received energy of the coil pair is 1.0−0.125= 0.875 of the energy received by coil 21. In this example, the presence of the second receive coil 23 for exciter and interference cancellation costs less than 0.6 dB in received power.

Figure 2:
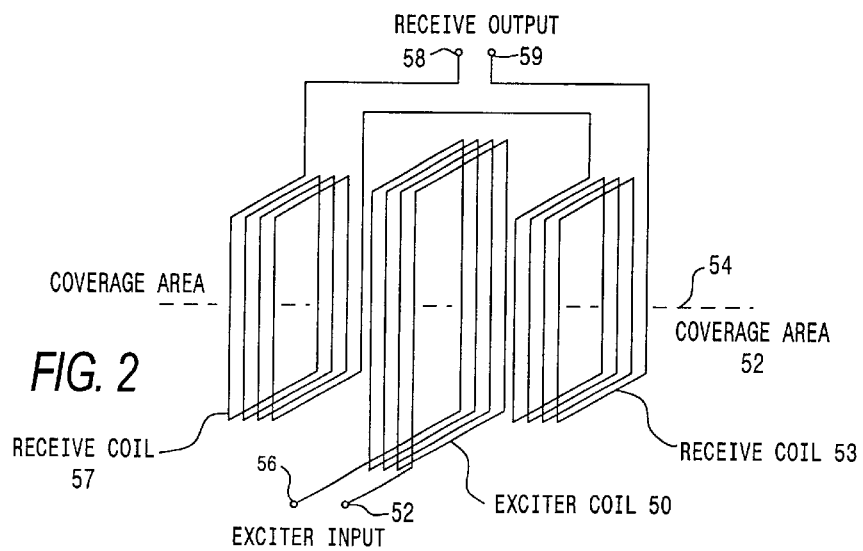
FIG. 2 diagrammatically illustrates the architecture of a second, large area transducer embodiment of the invention for use with doorway and conveyor belt coverage.

FIG. 2 diagrammatically illustrates the architecture of a second, large coverage area excitation—response coil embodiment of the invention that may be employed for doorway and conveyor belt coverage. In this embodiment, the size of an excitation coil 50 may be on the order of the coverage area 52 to be monitored for one or more object-tagged transponders. As a non-limiting example, this architecture may be employed in the embodiment of the transponder-tag reader arrangement shown in FIG. 5 of the above-referenced continuation-in-part application, wherein the excitation and reader/response coil arrangement is configured to optimize the robustness of the independence of the tag information storage and retrieval system to package or container orientation.

As in the ferrite rod embodiment of FIG. 1, described above, here a pair of receiver coils 51 and 53 are displaced laterally on the same centerline or axis 54 as the excitation coil 50. The operation of the second embodiment is effectively the same as that of the first embodiment, with an excitation signal applied to input terminals 56 and 57. However, in this second embodiment it has been found that as the coverage area increases, the coils become so large that lateral displacement therebetween must also increase in order to minimize loss of the desired signals in the composite output produced at output terminals 58, 59.

Figure 3:
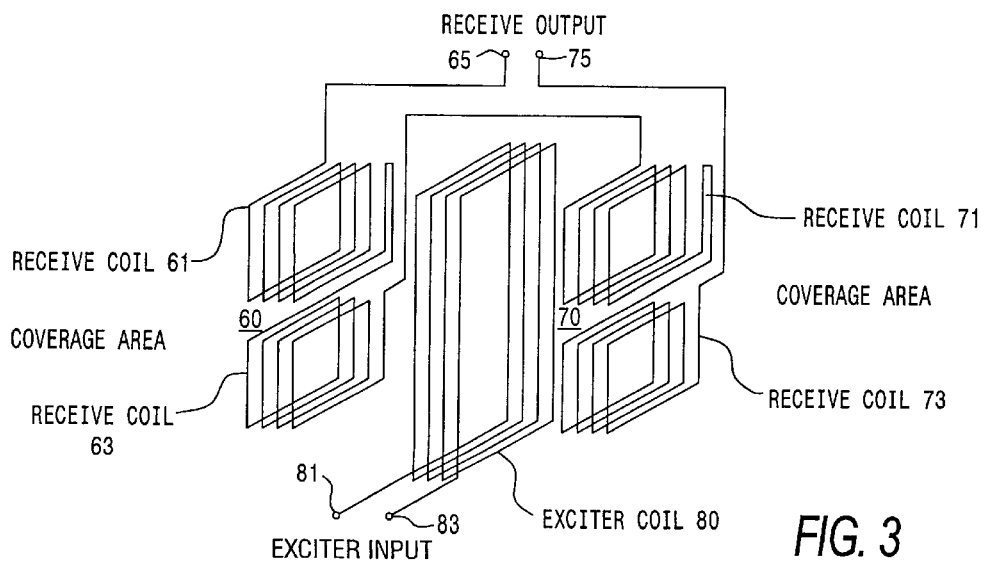
FIG. 3 diagrammatically illustrates the architecture of a third embodiment of the invention for use with large area coverage using arrayed receive coils.

To overcome this potential drawback, as shown in FIG. 3, each of the large receive coils 51 and 53 of FIG. 2 may be replaced by a plurality smaller coils 61, 63 and 71, 73 connected in an array fashion and placed on parallel planes 60 and 70, that are respectively located equidistant from a large area excitation coil 80 to input terminals 81 and 83 of which an excitation signal is applied. Again, as in the first and second embodiments, the receiver coils of the embodiment of FIG. 3 are connected so that the coils 61, 63 in plane 60 have the opposite polarity of the coils 71, 73 in the other plane 70, thereby causing far signals to cancel, whereas the resultant field amplitudes for closer (e.g., conveyor belt supported tag transponder-sourced magnetic field emissions) do not exactly cancel and therefore produce a net signal level for a signal processing circuitry coupled to output terminals 65, 75.

As will be appreciated from the foregoing description, the differentially configured magnetic field excitation and receiver coil configuration of the invention is operative to produce an electrical output that effectively cancels the effects of unwanted magnetic fields, such as an interrogating excitation field, and other (noise source) magnetic fields, yet produces a useful net output for the field produced by a nearby (object-tagged) transponder. As a consequence, the invention is particularly useful in severe electromagnetic environments, such as in industrial facilities containing heavy machinery and electromagnetic noise emitting processes.

While we have shown and described several embodiments in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. An apparatus comprising:
   an exciter coil having a coil axis;
   a plurality of magnetic field detection coils spaced apart from one another along said coil axis on opposite sides and in proximity of said exciter coil;
   said exciter coil being operative to emit an excitation magnetic field that stimulates a transponder located in the direction of said coil axis, but beyond said plurality of detection coils and said exciter coil therebetween, to emit a response magnetic field; and
   said plurality of magnetic field detection coils being operative to detect said response magnetic field emitted by said transponder, and being arranged and electrically differentially coupled with one another to produce a composite, transponder-discriminating electrical output, in which responses of said magnetic field detection coils to said excitation magnetic field are canceled, but being representative of the difference in said response magnetic field emitted by said transponder as detected by said plurality of magnetic field detection coils.

2. An apparatus according to claim 1, wherein said plurality of magnetic field detection coils comprise first and second magnetic field detection coils equally spaced apart from and on opposite sides of said exciter coil.

3. An apparatus according to claim 1, further including a core of high magnetic permeability material around which said exciter coil is wound.

4. An apparatus according to claim 1, wherein said plurality of magnetic field detection coils comprise a first plurality of first magnetic field detection coils spatially arranged in a first generally planar distribution on a first side of and parallel to said exciter coil, and a second plurality of second magnetic field detection coils spatially arranged in a second generally planar distribution on a second side of and parallel to said exciter coil.

5. An apparatus according to claim 4, wherein said first and second pluralities of magnetic field detection coils are smaller than said exciter coil.

6. A method of detecting an object comprising the steps of:
   (a) providing an exciter coil having a coil axis;
   (b) providing a plurality of magnetic field detection coils spaced apart from one another along said coil axis on opposite sides and in proximity of said exciter coil, and being arranged and electrically differentially coupled with one another to produce a composite electrical output;
   (c) providing said object with a transponder that is operative to emit a response magnetic field in reply to an excitation magnetic field coupled thereto;
   (d) emitting from said exciter coil an excitation magnetic field that stimulates said transponder located in the direction of said coil axis, but beyond said plurality of detection coils and said exciter coil therebetween, to emit said response magnetic field; and
   (e) detecting at said plurality of magnetic field detection coils said response magnetic field emitted by said transponder, and thereby producing said electrical output representative of the difference in said response magnetic field emitted by said transponder as detected and discriminated by said plurality of magnetic field detection coils, in which responses of said magnetic field detection coils to said excitation magnetic field are canceled.

7. A method according to claim 6, wherein said plurality of magnetic field detection coils include first and second magnetic field detection coils equally spaced apart from said exciter coil.

8. A method according to claim 7, wherein said exciter coil is wound around a core of high magnetic permeability material, and wherein said first and second magnetic field detection coils are spaced apart from opposite ends of said core.

9. A method according to claim 6, wherein said plurality of magnetic field detection coils comprise a first plurality of first magnetic field detection coils spatially arranged in a first generally planar distribution on a first side of and parallel to said exciter coil, and a second plurality of second magnetic field detection coils spatially arranged in a second generally planar distribution on a second side of and parallel to said exciter coil.

10. A method according to claim 9, wherein said first and second pluralities of magnetic field detection coils are smaller than said exciter coil.

* * * * *

UNITED STATES PATENT AND TRADEMARK OFFICE
CERTIFICATE OF CORRECTION

PATENT NO. : 6,268,723 B1  Page 1 of 1
DATED : July 31, 2001
INVENTOR(S) : Ronald J. Hash, Donald K. Belcher and Robert W. Boyd It is certified that error appears in the above-identified patent and that said Letters Patent is hereby corrected as shown below:

Drawings,
FIG. 2, delete and insert FIG. 2 as follows:

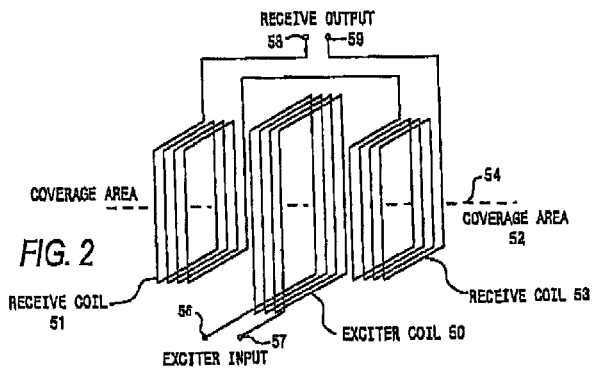

Column 2,
Line 57, delete "used of very" insert -- use of very --.
Line 61, delete "plurality smaller" insert -- plurality of smaller --.

Column 3,
Line 28, delete "may of the type" insert -- may be of the type --.
Line 38, delete "Embedded Transponder, now abandoned.'"' insert -- Embedded Transponder," now abandoned. --.

Column 5,
Line 35, delete "a plurality smaller coils" insert -- a plurality of smaller coils --.

Signed and Sealed this

Fifteenth Day of November, 2005

JON W. DUDAS
*Director of the United States Patent and Trademark Office*